(12) United States Patent
Murray et al.

(10) Patent No.: US 9,235,611 B1
(45) Date of Patent: Jan. 12, 2016

(54) DATA GROWTH BALANCING

(71) Applicant: Amazon Technologies, Inc., Reno, NV (US)

(72) Inventors: Edward Paul Murray, Sammamish, WA (US); Shireesh Prakash Gupta, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 13/912,042

(22) Filed: Jun. 6, 2013

(51) Int. Cl.
*G06F 17/30* (2006.01)
(52) U.S. Cl.
CPC .................. *G06F 17/30312* (2013.01)
(58) Field of Classification Search
CPC .............. G06F 9/505; G06F 17/30286; G06F 17/30595; G06F 17/30067; G06Q 10/101
USPC ......................................................... 707/802
See application file for complete search history.

(56) References Cited

U.S. PATENT DOCUMENTS

| | | | |
|---|---|---|---|
| 7,685,193 B2* | 3/2010 | Cohen ........................... | 707/714 |
| 2011/0078705 A1* | 3/2011 | Maclinovsky et al. ........ | 719/318 |
| 2014/0047084 A1* | 2/2014 | Breternitz et al. ............. | 709/221 |
| 2014/0052841 A1* | 2/2014 | Kanemasa et al. ............ | 709/224 |

* cited by examiner

*Primary Examiner* — Cam-Y Truong
(74) *Attorney, Agent, or Firm* — Baker & Hostetler LLP

(57) ABSTRACT

A distributed database management system maintains logical collections of data. The collections may grow at varying rates, and may place storage and workload processing demands on the system that change over time. A value representative of the current maximum of capacity utilization for computing nodes in the system may be calculated. An estimate of the number of days for each computing node to reach the current maximum may be calculated, and compared to an average number of days. Computing nodes whose number of days is above the average may be selected to receive new logical collections of data.

20 Claims, 8 Drawing Sheets

DATA GROWTH BALANCING

BACKGROUND

A distributed database management system ("distributed database") may be provided by a hosting company to store and retrieve data maintained on behalf of the hosting provider's customers. Large quantities of data may be involved. Furthermore, each customer may add additional data to the system on an ongoing basis, following unpredictable patterns that may vary for each customer and change over time.

To handle large volumes of data, the distributed database may divide tables of data into logical collections of data sometimes known as partitions, which may each be hosted on different computing nodes in order to distribute the consumption of storage and workload capacity related to the table. Each partition may, in turn, contain various collections of logically related data. Partitions and the collections of data they contain may exhibit different characteristics regarding their usage patterns and growth characteristics. Some partitions and collections of data may grow rapidly, while others may grow slowly or remain more or less the same size.

To evenly distribute consumption of storage and workload capacity, a distributed database may use various techniques to determine which computing node, among the computing nodes that comprise the distributed database, should receive a new partition or collection of data. Random distribution or other similar techniques may be employed so that data may be evenly distributed. However, in some cases the resulting distribution of data may be skewed regarding the growth rates of data housed on each computing node. Some computing nodes may experience rapid growth that the node does not have the capacity to accommodate, while other computing nodes in the system experience little growth and remain under-utilized.

BRIEF DESCRIPTION OF DRAWINGS

The drawings provided herein are designed to illustrate example embodiments and are not intended to limit the scope of the disclosure.

DETAILED DESCRIPTION

Figure 1:
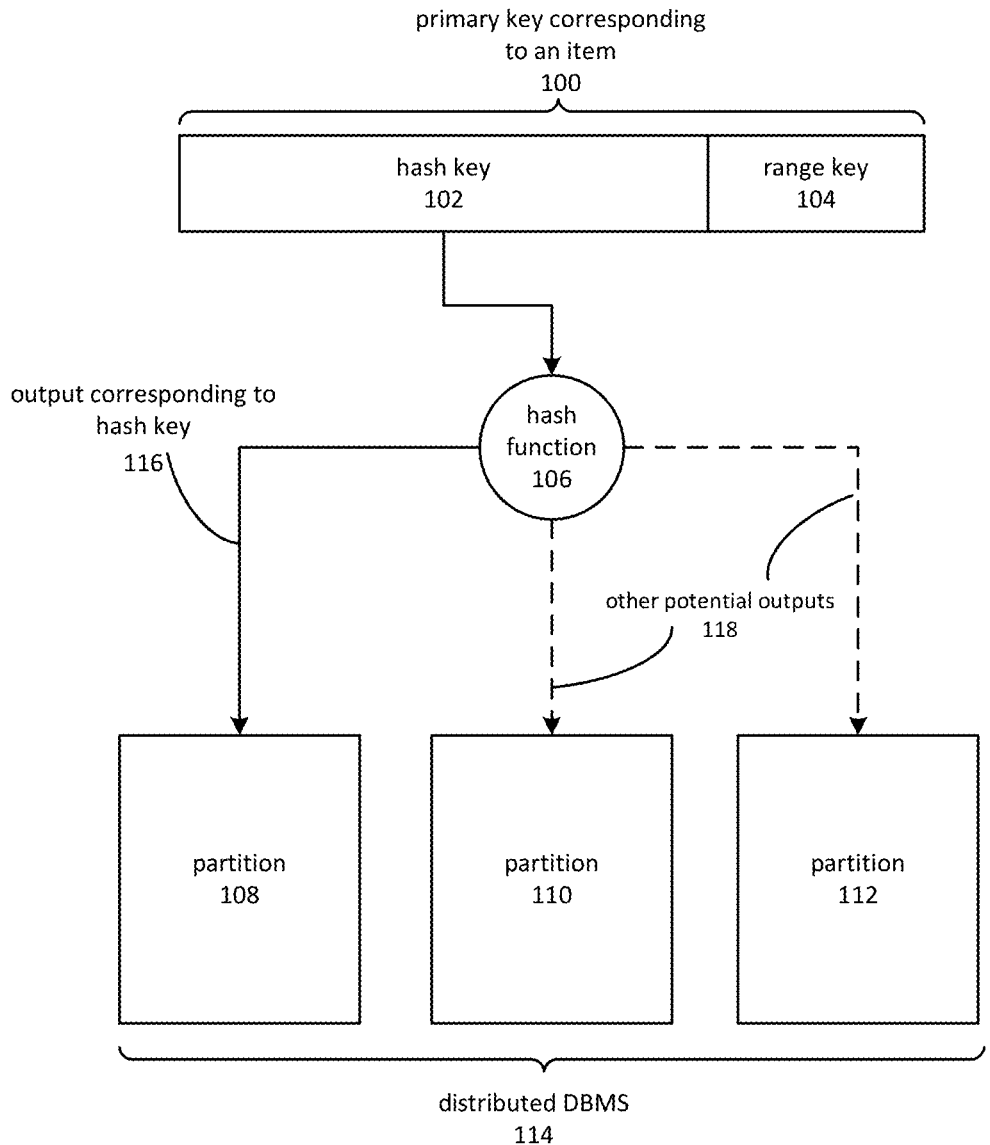
FIG. 1 is a block diagram depicting an embodiment of a distributed database employing a hash and range key function to access data partitions corresponding to computing nodes.

A distributed database may maintain collections of items grouped into tables. Each item may be uniquely identified by a primary key value, and may contain a number of additional values. The items may also be referred to as rows, and the values referred to as columns. In some systems, each row may be organized into a regular structure in which each row has the same number, types, and arrangement of columns. Other systems may not require a regular structure, for example databases organized as loose collections of key-value pairs. Various examples of distributed databases include key-value databases, relational databases, non-structured query language ("NoSQL") databases, object-oriented databases and so forth A distributed database may utilize a number of computing nodes built on commodity hardware, rather than using a smaller number of more powerful but more expensive computing systems. The use of commodity hardware may be more cost-effective, and may also allow for greater volumes of data to be managed because even the most powerful servers cannot scale storage and computing capacity indefinitely. Accordingly, various techniques may be employed to distribute the storage requirements and workload demands of a distributed database across multiple computing nodes, sometimes referred to as shards. One technique involves dividing database tables into distinct segments known as partitions. Each partition may be hosted on a separate computing node, so that workload associated with the table may be divided between multiple nodes. A distributed database may host partitions on dedicated computing nodes that only handle one partition each, or multiple partitions may be hosted on a single computing node.

Various forms of partitioning may be supported. In horizontal partitioning, each computing node may maintain a subset of the collection of items. For example, data whose primary key values begin with the letters "A" through "M" might be placed in one partition, and data whose primary key values begin with the letters "N" through "Z" might be placed in another. Another form of partitioning is vertical partitioning, in which data is divided based on columns or fields, so that each partition contains a subset of the columns defined on the table. For example, a table might consist of two columns. A first partition could contain the set of data for the first column, and a second partition could contain the set of data for the second column. Distributed databases may also combine horizontal and vertical partitioning techniques.

Horizontal partitioning may involve the use of primary key values to assign items to a partition or to locate the partition in which an item is stored. Each primary key value, taken as a whole, uniquely identifies an item stored in the table. To access an item, a client of the distributed database may issue a request that includes a primary key value corresponding to that item. A hash table, mapping or similar function may be employed to locate the appropriate partition using the primary key value as input.

In some embodiments, the primary key may be composed of two portions, a leading portion sometimes referred to as a hash key, and a trailing portion sometimes known as a range key. The leading portion, or hash key, may be used to locate a computing node on which an item is stored. The range key may be used to perform queries over a range of items stored on the computing node indicated by the hash key. A query of this type may apply to all items having the same hash key value. The applicable set of items may also be limited by applying a filter to the items' range key values. The hash key may also be subdivided into various portions. Some embodiments may use a portion of the hash key to identify a logical collection of data that could be placed on a single partition.

Primary keys may be defined when the table is created. A description of the primary key may be stored with other aspects of the table's schema, which may include any required columns, constraints on values and so forth. For the primary key, schema may include a description of the length and value of a primary key. For example, a primary key might be defined as a 256-bit binary value, or as a variable-length string of characters.

The primary key may also be defined as having an internal structure. Although in some embodiments a primary key's structure may consist only of a single value, embodiments may support or require that the primary key comprise a composite of two or more values. For example, one form of primary key divides the key into two portions, a hash key and range key. Together, these portions of the primary key may reflect or define hierarchical relationships within a collection of items. A hash key may identify a group of items within the hierarchy while a range key identifies specific items within the group.

The distributed database may use various schemes to randomize the placement of items across multiple computing nodes, while still allowing the node on which an item is stored to be located using a hash key. Random distribution of items may improve the performance of read and write operations because the workload related to processing the read and write operations would tend to be evenly distributed across the multiple computing nodes. Range queries made over a range key may remain efficient because all items with a particular hash key value are located on the same computing node.

One method of horizontal partitioning involves applying methods of distributing data between various computing nodes in a random or semi-random fashion. FIG. 1 depicts one such method. Primary key 100 comprises hash-key component 102 and range-key component 104. Random or semi-random distribution of data across computing nodes 108, 110 and 112 may improve performance of distributed database 114. Accordingly, an item may be stored on one of computing nodes 108, 110 and 112 based on application of hash function 106 to hash-key component 102.

Hash function 106 may be computer code that translates a primary-key value to another value, such as an integer, in what may be described as a key space. The hash function 106 may be configured to translate input primary values to a semi-random point in the key space, in which a given input value translates to the same point in the key space on each invocation of the function. A given hash function may map to a finite set of points, or buckets, within the key space. In various embodiments, hash function 106 may cluster mappings around certain points. For some hash function, this may occur when input values are similar. The skewing may degrade performance because it may result in an uneven distribution of items on a particular computing node. One approach to preventing this problem is to use a hash function that maps to a large number of discrete points within the key space. Regions of key space can then be assigned to computing nodes. Alternatively, regions of key space can be assigned to an intermediate data structure that refers to a computing node. Different regions may be mapped to the same computing node or intermediate data structure.

Returning to FIG. 1, hash key 102 of primary key 100 may be supplied as an input value to hash function 106. For a given value of hash key 102, application of hash function 106 produces output corresponding to hash key 116. The output of hash function 106 is constant for a given input value. Application of other values to hash function 106 may produce other potential outputs 118, but the results for any given input value are consistent. The consistent output 116 may be used to determine where to initially store the item that corresponds to primary key 100. In addition, because the output of hash function 106 is consistent for given input values, hash key 102 may be applied to hash function 106 to determine where an item was previously stored.

The technique depicted in FIG. 1 may be used to divide workload and storage requirements across multiple computing nodes by distributing data across multiple partitions. Random or semi-random distribution of data may act to evenly distribute storage and workload capacity demands over the available computing nodes. However, these techniques do not by themselves account for the potential for growth, nor do they account for the effects of collocating partitions for other tables on the same computing node.

A distributed database may comprise a large number of computing nodes capable of hosting partitions. However, while some large tables may occupy numerous partitions, other tables may be very small and occupy few partitions, including a single partition. Embodiments may employ various techniques to place partitions on computing nodes so that workload and storage requirements are evenly balanced.

However, determining where to place partitions may be complicated by various factors. Random and semi-random placement techniques may be employed, but do not by themselves account for the potential for changing storage and workload capacity demands. The distributed database may host data on behalf of various and potentially numerous customers. A distributed database may be hosting a number of tables on behalf of each customer. These tables may each be further divided into multiple partitions. The storage requirements and workload associated with each table and with each partition may vary. In addition, although hash key techniques such as those depicted by FIG. 1 could be employed to distribute consumption of workload and storage capacity, random placement of items may not always produce an even distribution. Furthermore, the workload and storage requirements of a table or partition may change over time. In some cases, some partitions may grow more rapidly than others. If these partitions are located on the same computing node, the storage and workload utilization of that computing node may increase more rapidly than other nodes in the system. Embodiments may employ various techniques, disclosed herein, to place partitions in a manner that accounts for expected growth.

Figure 2:
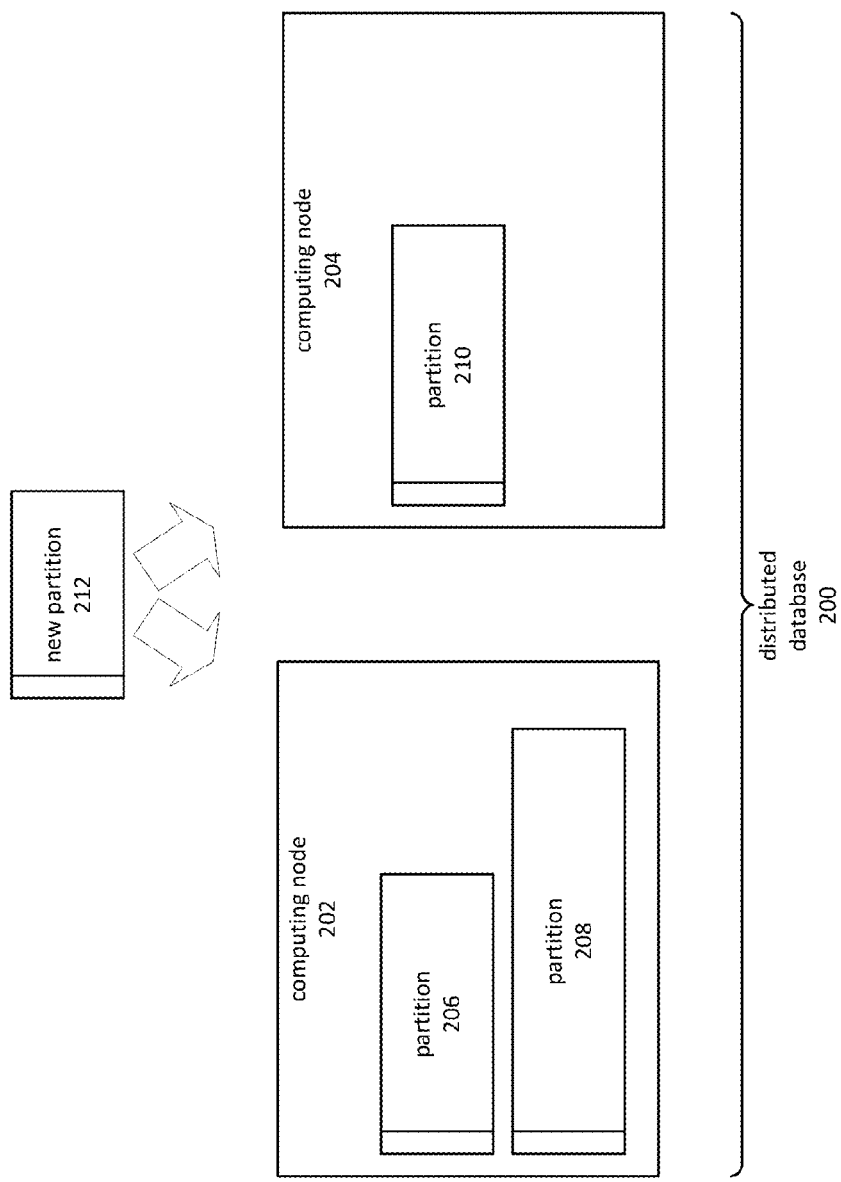
FIG. 2 is a block diagram depicting an embodiment of a distributed database comprising two computing nodes containing a number of preexisting partitions, and to which a new partition is to be added.

FIG. 2 depicts an example of a distributed database 200 on which a new partition 212 might be placed on either computing node 202 or computing node 204. Computing node 202 might already house partition 206 and partition 208, while computing node 204 might house partition 210. Various considerations, including but not limited to those discussed in the following paragraphs, may be relevant when determining which computing node should house new partition 212.

One consideration is how much storage space and workload capacity are presently available on computing node 202 and computing node 204. Available storage space may be determined by various factors, such as the capacity of storage devices connected to each computing node and the amount of space consumed by partitions already occupying the computing node. Embodiments may also impose other limitations on available storage capacity, for example to ensure that sufficient space is available for other applications, maintenance operations on the database and so forth. Storage capacity may be measured in terms of unutilized space on the storage device. Some embodiments may utilize other metrics, such as a number of rows stored in each partition. Data files used by the distributed database may contain reserved space, which can be included in an estimate of available storage capacity.

Workload capacity may be defined as the ability of a computing node, database, application or other computing resource to perform work. Many factors may influence ability to perform work, such as the number and speed of physical or virtual central processing units ("CPUs"), available memory, network bandwidth, storage device throughput, efficient software design and various other factors. Workload capacity may be measured or estimated using various metrics, such as CPU utilization, network bandwidth utilization, disk queue length, database transactions per second and so forth. Because such metrics may be subject to frequent variation, embodiments may utilize moving averages or other means of smoothing out transient variations in the measured values.

The measures of storage and workload capacity discussed in the preceding paragraphs may be considered to be snapshot values, or in other words indication of capacity utilization at a fixed point in time. When placing partitions, the rate of change may also be a relevant factor. For example, in FIG. 2, it could be the case that partition 210 on computing node 204 is growing at a rapid pace while partitions 206 and 208 on computing node 202 are growing slowly. If so, then placing new partition 212 on computing node 202 might be preferable, even if computing node 202 has less currently available capacity than computing node 204. This may be the case, for example, when computing node 204 contains collections that are currently small but likely to experience rapid growth.

Figure 3:
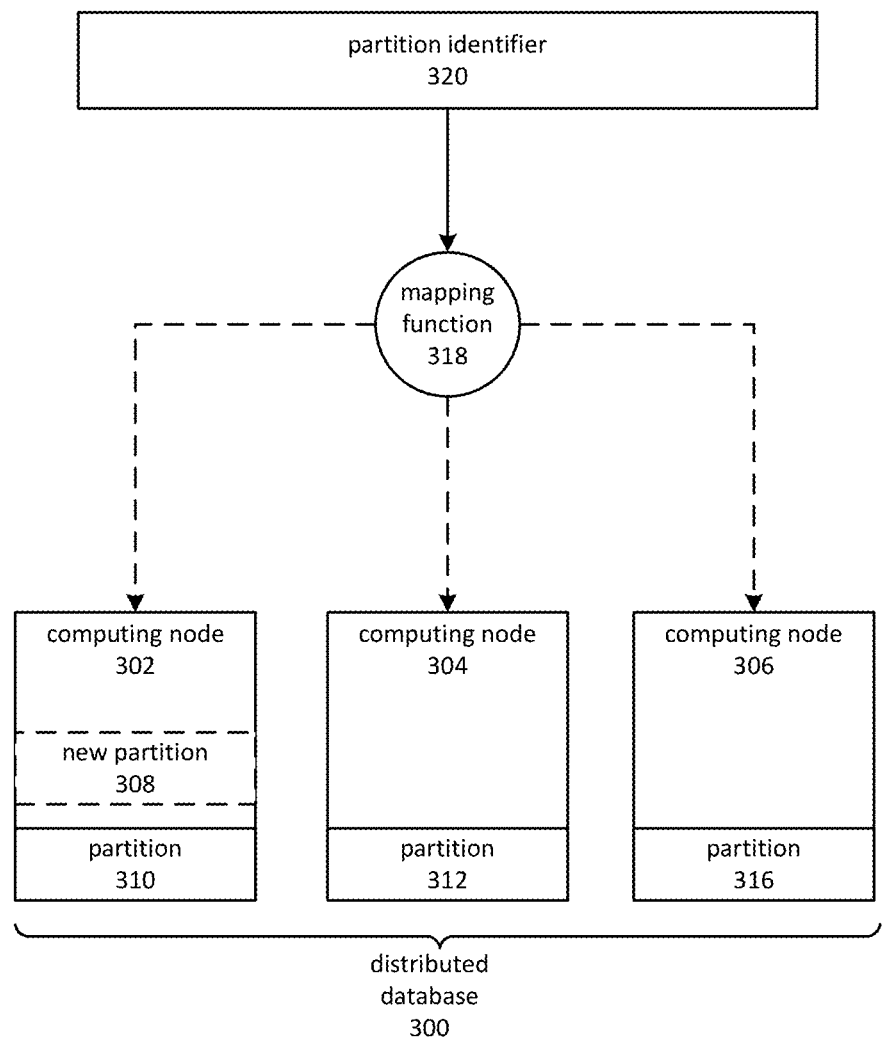
FIG. 3 is a block diagram depicting an embodiment of a distributed database and a mapping function that assigns new partitions to a computing node.

FIG. 3 depicts an illustrative example of assigning partitions to a computing node. Distributed database 300 might comprise three computing nodes 302, 304 and 306. Initially, as partitions are added mapping function 318 may place the added partitions on each of computing nodes 302, 304 and 306 using random assignment, round-robin assignment or the like. For example, mapping function 318 might employ a hash algorithm on a partition identifier 320 to determine where to place that partition. Alternatively, it could assign partitions using round-robin selection. These approaches to placement might continue until storage or workload capacity utilization reaches a threshold level or until at least a threshold number of partitions have been assigned to each computing node. In FIG. 3, for illustrative purposes the threshold may be considered to have been reached with the assignments of partition 310 to computing node 302, partition 312 to computing node 304 and partition 316 to computing node 306.

Mapping function 318 may cause a record to be stored indicating which computing node received the partition. The record may be stored in a manner that allows for subsequent retrieval based on partition identifier 320. The record may for example be stored in a database table mapping between partition identifiers and computing nodes. A partition identifier may be a value that can be used to identify a partition, such as a customer identifier, a subset of a primary key value, an artificial identifier and so forth.

After a threshold level of utilization has been reached, mapping function 318 may employ an alternative method of assigning partitions to computing nodes. For example, new partition 308 might be assigned to computing node 302 based on the output of mapping function 318. The assignment might be based on combinations of factors such as how much storage or workload capacity has been utilized by partition 310 and the rate of change of storage or workload capacity on computing node 302.

Embodiments of the present disclosure may also be applied to other logical collections or subcollections of data. Partitions, for example, may be considered to be a logical collection of data. Within a partition, a logically related set of data may also be described as a logical collection of data. In general terms, a logical collection of data may be defined as data grouped by some characteristic, including natural affiliations or artificial affiliations. Further non-limiting examples of logical collections include database tables, subpartitions, storage file groups, disk files and so on. Each logical collection may be associated with some level of storage and capacity utilization demands. These demands may change over time, or may be static.

Each logical collection of data may have differing growth characteristics, and these characteristics may change over time. For example, a table might contain information about the sale of recordings by various musical artists. Certain recordings by popular artists may tend to have significantly greater sales than other less popular artists. Furthermore, some recordings may have a high initial volume of sales followed by a trailing off period in which sales steadily decline. Accordingly, if this data is maintained in a single table with multiple partitions, an embodiment might place each artist's sales records on a particular partition based on factors such as the rate at which capacity utilization is changing on a given computing node.

Each logical collection may also have differing usage characteristics. Some collections of data may be associated with a high concentration of write requests. This pattern may tend to occur in data that is organized by date or time, because more data may be generated in the current timeframe than in previous historical periods. Other collections of data may be associated with a higher concentration of read requests. In addition, some collections of data may be subject to more complex queries, leading to higher demands on workload processing capacity.

Figure 4:
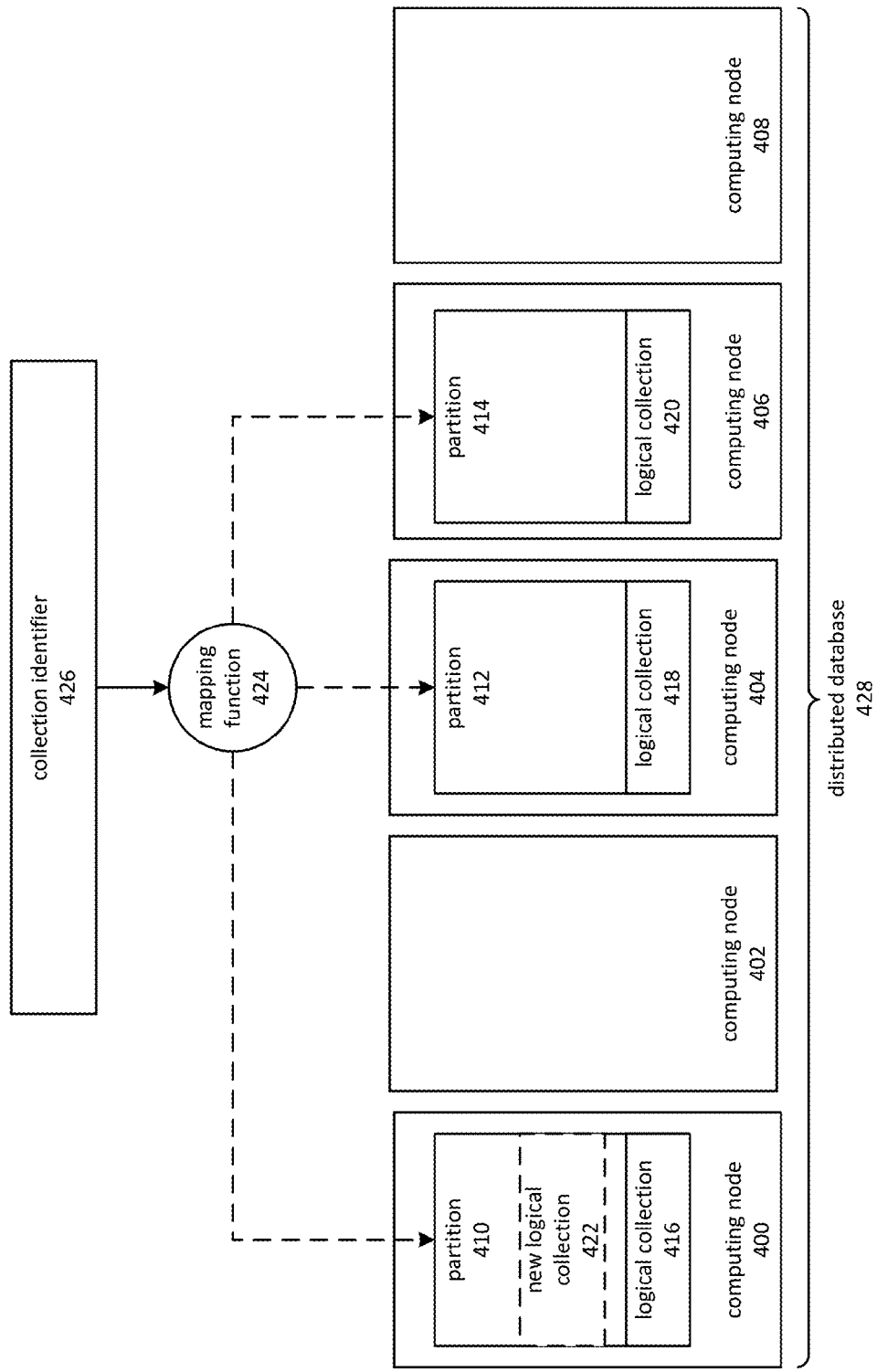
FIG. 4 is a block diagram depicting an embodiment of a distributed database comprising computing nodes housing partitions, to which logical collections of data are placed through the use of a mapping function.

FIG. 4 depicts an example embodiment for placing logical collections of data within a partition. A distributed database 428 may comprise five computing nodes 400, 402, 404, 406 and 408. A table might be comprised of three partitions 410, 412 and 414. Using various techniques, such as those disclosed herein, partitions 410, 412 and 414 might be placed on computing nodes 400, 404 and 406. Various other partitions, for other tables, may also be distributed among the five computing nodes 400, 402, 404, 406 and 408. Logical collections of data may be placed within the partitions. In some embodiments, the logical collections may initially be placed into empty partitions using random assignment, hash tables, round-robin or other such techniques, following by placement based on factors such as the rate at which capacity utilization is changing. Alternatively, placement of data within partitions may always be based on factors such as the rate at which capacity utilization is changing.

In FIG. 4, logical collections 416, 418 and 420 are depicted as having been placed into partitions 410, 412 and 414 respectively. As indicated previously, placement of logical collections of data (including partitions) may occur in two stages. In the first stage, the logical collections may be placed using an initial assignment technique such as hash-tables, round-robin, random assignment, semi-random assignment and so forth. In the second stage, assignment may be based on factors such as storage and workload capacity utilization and the rate at which these factors change. The first stage may end when a threshold level of storage or workload capacity utilization has been reached, when each computing node or partition has at least some data present, or when all currently held data has been placed. The latter case may occur when an existing collection of data is redistributed using one of the initial stage techniques. It may also be a de facto case when a switch from stage one to stage two is triggered—it is for example the same as enabling the stage two technique on an existing collection of data.

A new logical collection 422 may be added to the system once the second stage technique has been enabled. In FIG. 4, partition 410 may have been selected to house new logical collection 422 based on the rate of growth of storage or workload capacity utilization in partition 410. Alternatively, partition 410 may have been selected to house new logical collection 422 based on the rate of growth of storage or workload capacity utilization by computing node 400.

Storage capacity utilization may refer to the consumption of space on one or more storage devices coupled to a computing node. Thus, as a logical collection of data grows, its utilization of storage capacity increases. Workload capacity utilization may involve the consumption of computing resources necessary to process requests associated with a logical collection. For example, various queries may be performed to retrieve items from a logical collection of data. Performing these queries may require consumption of various computing resources of the computing node that houses the logical collection. Examples include, but are not limited to, CPU utilization, working set, network bandwidth, disk input/output and so forth. These measures tend to be dynamic values that may change significantly depending on when the sampling occurs. However, as a logical collection of data grows, it may be associated, on average, with greater consumption of these resources.

When new logical collection 422 is added to the system, mapping function 424 may have determined its assignment to partition 410 and recorded it, so that subsequent attempts to locate the item may be directed to the correct partition, in this case partition 410. Recording the assignment may involve maintaining a map between a collection identifier 426 and corresponding partition 410.

The placement of logical collections of data on computing node may impact the future performance of the system because of the storage and workload capacity demands associated with logical collections. Logical collections of data associated with high demand might be concentrated on one computing node, possibly resulting in the computing node being overloaded. Logical collections of data associated with low demand might be concentrated on another computing node, possibly resulting in that computing node being underutilized. Moreover, the concentration of storage and workload capacity demands may change as the individual collections change over time, sometimes in unexpected ways. Conventional techniques for handling this situation may rebalance the collections, for example by relocating high-demand collections to underutilized computing nodes. However, embodiments of the present disclosure may be employed to perform initial placement in a manner that minimizes the need for future rebalancing.

Figure 5:
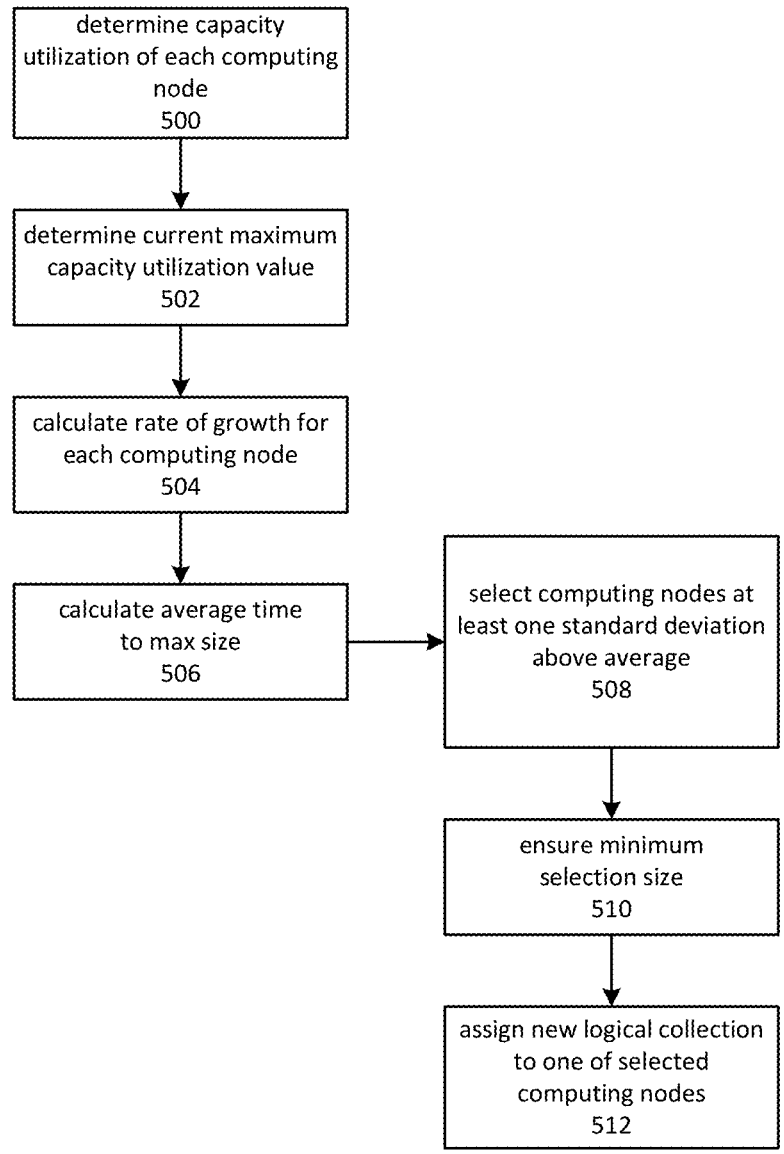
FIG. 5 is a flowchart depicting an embodiment for determining where to place logical collections of data based on a current maximum of capacity utilization, the length of time each computing node would take to reach the current maximum, and the average length of time to reach the current maximum.

FIG. 5 depicts an embodiment of a technique for selecting a computing node to host a logical collection of data. Although depicted as a sequence of operations, those of ordinary skill in the art will appreciate that at least some of the depicted operations may be altered, omitted, reordered or performed in parallel. Furthermore, although described as an embodiment for placing logical collections of data on a computing node, the techniques described may be applied to a wide variety of embodiments. In general, the technique may be applied to allocating consumption of storage or workload capacity to a provider of said capacity, where a rate of change for utilization of that capacity may be measured or estimated. Consumption of storage or workload capacity may be associated with placing a partition on a computing node, placing a logical collection in a partition, selecting a computing node to perform a command and so forth.

Operation 500 depicts determining the current capacity utilization of each available computing node in a distributed database. The available computing nodes are those that are able to receive new logical collections of data, and the accompanying consumption of storage or workload capacity. As noted herein, a variety of metrics may be employed to determine capacity utilization through various techniques involving measurement, estimation, calculation and so forth. Embodiments may utilize a count of the number of rows or items in a database table, compared to the estimated total capacity of rows that may be stored. An estimate may be calculated based on the size of rows in each table, or an average size, and the space available for storing rows, including any reserved space. Embodiments may use row counts when other measures, such as the number of bytes available for storage, are not accurate due to space being reserved for storing rows.

Another means of measuring current capacity utilization involves current transactions per unit of time as compared to an estimated maximum number of transaction per unit of time. The unit of time may be selected so as to produce a relatively stable measurement, or a long-term average of a smaller unit of time may be used. Embodiments may also employ moving averages and similar techniques. The estimated maximum number of transactions per unit time may be based on a variety of factors including experimental observation, theoretical maximums and so forth.

Longer-term metrics of capacity utilization may be employed to reduce the risk that transient measurements would cause estimates of current capacity utilization to be uncharacteristic of their actual values. The length of time used may be determined based on various factors such as the expected rate of change of a metric being measured, the monotonicity or lack of monotonicity of the metric and the frequency with which the metric is utilized, for example.

Combinations of metrics may also be employed, and weighted to reflect the relative importance of the metric with respect to the other metrics being utilized. The metrics selected, as well as their respective weightings, may be chosen using factors such as the likelihood that the computing resource underlying the metric would act as a bottleneck.

Once the current capacity utilization of each computing node has been determined, the maximum capacity utilization among all of the computing nodes may be determined. This may be the capacity utilization value that is higher than all other capacity utilization values. This step is depicted by operation 502.

Some embodiments may omit operations 500 and 502. Instead of performing these operations, a threshold value may be used in conjunction with determinations of time to maximum size. The threshold value might be determined based on a percentage of a computing node's predicted absolute maximum capacity. For example, rather than explicitly calculating a current maximum of capacity utilization, the predicted absolute maximum capacity might be determined through experimentation. This value might then be multiplied by a percentage to determine a value to use as the current maximum size used in conjunction with operation 506.

At operation 504, the rate of capacity utilization growth is determined for each computing node. Embodiments may exclude the computing node with the current maximum utilization value. The rate of capacity utilization growth may be a single value corresponding to a single metric, such as the number of rows in a table. The rate of capacity utilization growth may also involve a number of values if more than one metric is to be used. Embodiments that employ multiple metrics may combine the metrics into a single value, possibly after weighting and/or normalizing the metric values.

Various techniques may be employed to determine the rate of growth. Embodiments may, for example, compare the previous value with the current value to determine a delta value. Averages from prior periods and the current period might also be employed. Embodiments might also save values of the metrics over time and apply various forms of regression analysis. Embodiments may for example employ linear or non-linear regression over the metric values to estimate a rate of growth. Embodiments may also employ various growth models, which might combine observed values with estimated growth patterns. For example, in some cases logical collections of data may tend to experience an initial period of high growth followed by a trailing-off period. A model of the rate of change might therefore be constructed to estimate the overall rate of growth on the computing node based on the age of the logical collections contained within it.

Operation 506 depicts using the rate of change to calculate an average time of reaching the current maximum of capacity utilization. For each computing node, embodiments may use the previously calculated rate of change values to determine the length of time the computing node will take to reach the same level of capacity utilization as the computing node that is associated with the maximum capacity utilization value. The average length of time across all of the available computing nodes may then be averaged.

At operation 508, a set of computing nodes may be selected as potential recipients of additional logical collections. The computing nodes may be selected based on the average length of time to the current maximum capacity utilization value and each computing node's length of time to maximum capacity utilization. Embodiments may select those nodes having a length of time at least one standard deviation above the average length of time. Embodiments may use a threshold value other than one standard deviation. Using higher values may reduce the number of selected computing nodes, but those nodes would tend to have increased potential as placement sites. Using lower values would increase the number of selected computing nodes, but the selected computing nodes may have decreased potential as placement sites. Nodes not included in the set of selected computing nodes may be prevented from being associated with additional logical collections.

Projections based on current utilization levels and growth rates for existing collections may be used to place additional logical collections of data on computing nodes in a manner that reduces or eliminates the need for rebalancing collections in the future. This may be because the utilization of a statistically significant average improves the accuracy of collection placement. Another factor may be that the use of projected times to reach a current maximum utilization, rather than an absolute maximum, helps to distributed expected growth more evenly than conventional approaches.

When the number of selected nodes is small, the assignment of new logical collections of data may be concentrated on a few computing nodes. When this is the case, the rate of change of capacity utilization for the selected computing nodes may increase significantly. Embodiments may therefore ensure, as depicted by operation 510, that the set of selected computing node contains at least a threshold number of members. The threshold number may be determined based on a variety of factors, such as the rate at which new logical collections are added, the frequency with which each computing node in the set of open nodes is selected to receive a logical collection, experimental observations and so forth. Embodiments may, for example, select the threshold number based on the rate at which new logical collections are expected to consume storage capacity and the frequency with which the set of selected nodes is recomputed. Based on these values, an increase in capacity utilization may be predicted for the period between recomputations. Embodiments may prefer that the nodes considered open for selection have at least as much extra capacity on the selected computing nodes as is expected for the period.

The set of selected computing nodes may be expanded by adding additional nodes up to the threshold number. Embodiments may select the additional computing nodes by identifying, among the computing nodes not already selected, those with the lowest capacity utilization. Those computing nodes with the lowest rate of change might also be selected. Another approach is to select the additional nodes by choosing those with the longest remaining time to maximum utilization. Embodiments may progressively lower the threshold from the original value—say one standard deviation above the average—to a lower value until the threshold number of computing nodes has been selected.

Once a set of computing nodes has been selected, new logical collections of data may be assigned to it. In other words, new logical collections of data may be assigned to one of the set of open computing nodes, or prevented from being assigned to one of the set of closed computing nodes. This is depicted by operation 512. New logical collections may be assigned to one of the selected set of computing nodes by various methods, such as using a hash of a primary key, performing round-robin selection, random or semi-random assignment and so on.

Figure 6:
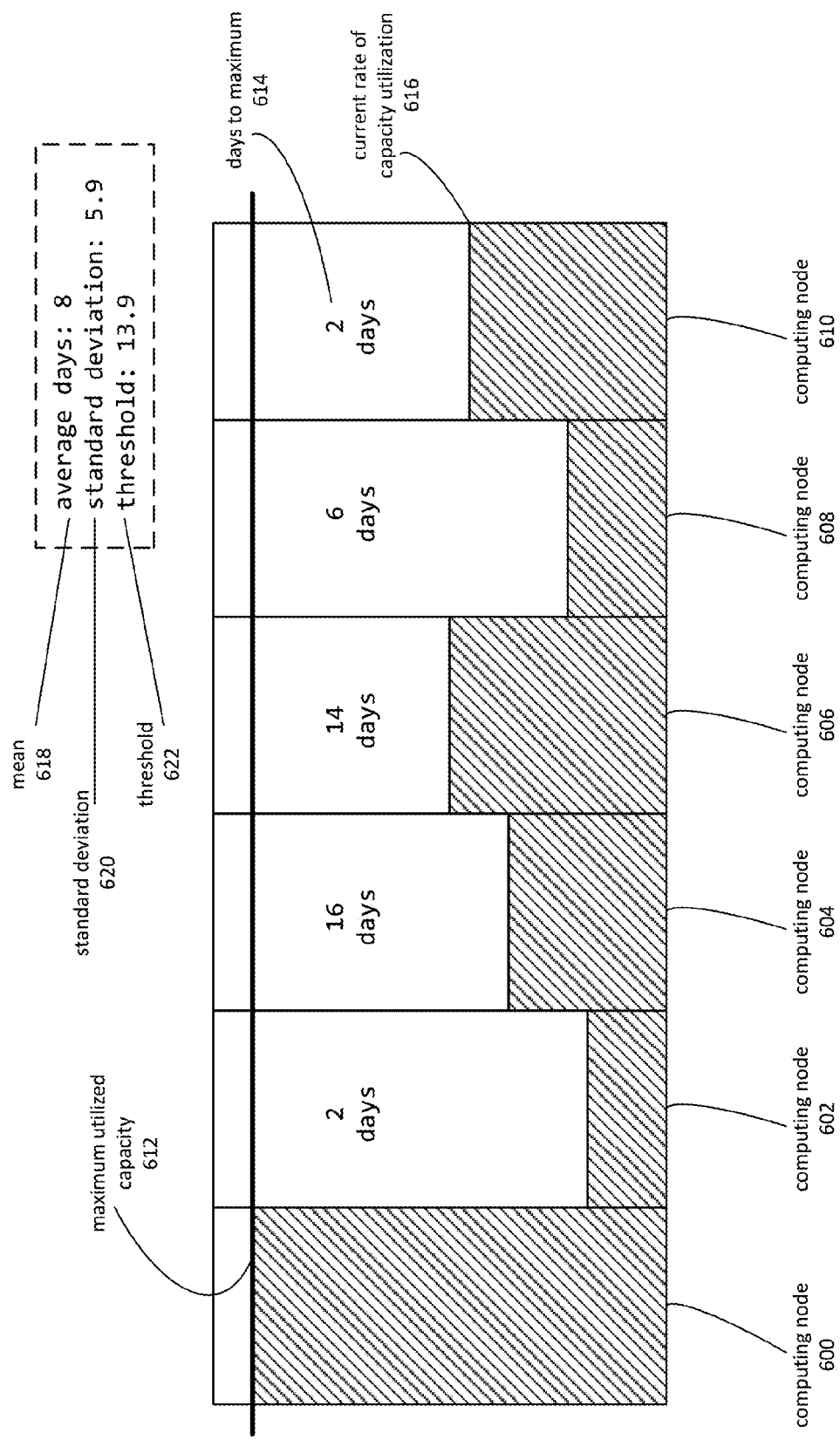
FIG. 6 is an illustrative example of using projected days to reach maximum currently utilized capacity to form a set of candidate computing nodes for receiving new logical collections of data.

FIG. 6 is an illustrative example of assigning computing nodes to a set of selected computing nodes based on a projected number of days to reaching the maximum capacity utilization of any available computing node in the system. The set of selected nodes may then be assigned new logical collections using various techniques, as disclosed herein, for evenly distributing new collections among the set of selected nodes.

A distributed database or other computing system may be made of a number of computing nodes 600, 602, 604, 606, 608 and 610. Each node may be considered available for receiving a logical collection. Of these computing nodes, computing node 600 currently has the highest level of capacity consumption, as indicated by the line maximum utilized capacity 612.

A rate of change may be calculated for each of computing nodes 602, 604, 606, 608 and 610. The rate at which capacity consumption is changing may be calculated for each of these computing nodes. Based on the calculated rate of change, the number of days it would take for each computing node to reach the same capacity utilization levels as computing node 600 may be calculated. For example, computing node 610 shows a current rate of capacity utilization 616. Based on the rate differential of this value, a number of days to maximum 614 may be calculated. This value is an estimate of how long, given the logical collections currently assigned to computing node 610, it would take to reach the same level of utilization as computing node 600, indicated by the maximum utilized capacity line 612. For computing node 610, the number of days to maximum 614 is depicted as two days.

Based on the calculated number of days to maximum for each of computing nodes 602, 604, 606, 608 and 610, statistics including mean 618, standard deviation 620 and threshold 622 may be calculated. As depicted in FIG. 6, the mean 618 of the days to reach maximum utilized capacity line 612, over computing nodes 602, 604, 606, 608 and 610, is eight. A threshold value 622 may be calculated as 13.9 based on adding a standard deviation 620 value of 5.9 to the mean 618 value of eight. Embodiments are not limited to using a threshold based on one standard deviation above the mean. Various embodiments may, for example, calculate a threshold value as a percentage of the mean, may use a median calculation or various other similar statistical methods employable to select computing nodes with higher probabilities of being suitable placement locations. By adding a standard deviation or other confidence interval to the average, comparisons using threshold value 622 may be made statistically significant over comparisons made using mean 618 alone.

In the example depicted by FIG. 6, the resulting threshold value 622 may be used to select a set of computing nodes that may be opened for accepting new logical collections. Computing nodes 604 and 606 have days to maximum values of 16 and 14, respectively. These two computing nodes may be selected for opening because they are above 13.9, the value of threshold 622.

Embodiments may act to ensure that new logical collections are distributed among a sufficiently large segment of the available computing nodes. For example, in the example of FIG. 6 two computing nodes were opened for assignment. Additional nodes might be selected to bring the total number of opened nodes to at least a threshold level. One additional node could be added if, in the example of FIG. 6, the threshold number were three. Embodiments might select the computing node with the lowest capacity utilization, such as computing node 602. Other embodiments might base the calculation based on selecting nodes with the maximum number of days to reaching maximum capacity, such as computing node 608, which has the longest number of days excluding computing nodes 604 and 606, which were already selected.

Figure 7:
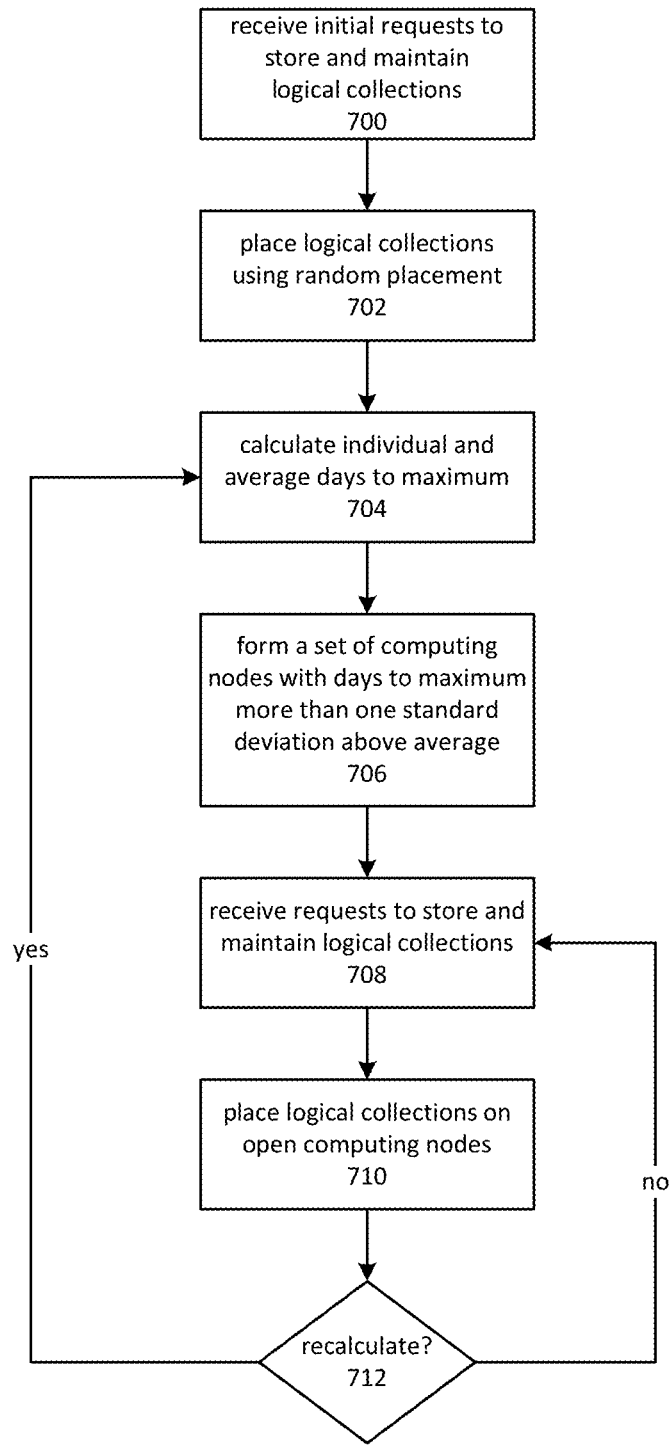
FIG. 7 is a flowchart depicting an embodiment for initially placing logical collections based on a random distribution method followed by periodic opening and closing of computing nodes to placement of logical collections of data, based on days to maximum current capacity utilization.

FIG. 7 depicts an embodiment for periodically recalculating a set of computing nodes which may be assigned new logical collections. Although depicted as a sequence of operations, those of ordinary skill in the art will appreciate that at least some of the depicted operations may be omitted, altered, reordered or performed in parallel.

Operation 700 depicts receiving an initial set of requests to maintain logical collections of data in a distributed database management system. Initial requests may comprise operational requests received over a period of time, or received in bulk during a data loading process or similar operation. Receiving a request to store and maintain data might be performed when initiating services for a new customer of a hosted database service, when creating a new table, when creating a new partition, when inserting logically related data into a table and so forth.

The initial requests to store and maintain logical collections of data may be performed by randomly placing the logical collections on all of the computing nodes that comprise the distributed database management system, as depicted by operation 702. Operation 704, as well as the previous operation 702, may be omitted by some embodiments. For example, the operations may be omitted if aspects of the present disclosure are practiced in conjunction with a distributed database that contains preexisting data.

At operation 704, the individual and average days to reach the current maximum value of capacity utilization may be determined. For example, for each computing node the rate at which capacity utilization is growing may be determined, and then used to determine the number of days that node will take before it meets or exceeds the same level of capacity utilization as the computing node that is, at the time of calculation, the most heavily utilized.

Based on these values, a set of open nodes may be formed to identify those computing nodes that may be used to receive subsequent placements of logical collections. As depicted by operation 706, computing nodes whose estimated days to maximum values are more than one standard deviation above the average may be selected to join the set. Various other confidence intervals may be employed to add to the statistical significance of the comparison.

Operation 708 depicts receiving further requests to store and maintain logical collections of data on a distributed database management system. Requests received by this operation may be placed on one of the set of computing nodes selected by operation 706 to be open to new placements. Computing nodes not in the set may be considered closed to new placements until the set of open computing nodes is recomputed. Additional nodes may, however, be added to the set to ensure that a minimum number of computing nodes is available for placement.

At operation 710, the requests to add logical collections may be processed by selecting a computing node from the set of open computing nodes. As described herein, the computing node may be selected from the set of open computing nodes based on a variety of techniques such as random selection. The remaining nodes may be viewed as closed, or in other words prevented from receiving additional logical collections. The computing node selected from the set of open computing nodes may then perform whatever steps are necessary to begin housing the logical collection. Initially, this may consist of associating the logical collection with the computing node. A mapping between some identifier associated with the logical collection and the computing node might be established. One example of an identifier is a prefix portion of primary keys. Once the logical collection has been associated with a computing node, data associated with the collection may be stored on the computing node.

At operation 712, it may be determined that a recalculation is in order. Recalculating the set of open computing nodes may involve repeating the operations depicted by 704 and 706. Some steps of the calculation may be omitted in order to optimize the recalculation. For example, depending on the amount of additional data added to the system the current maximum capacity utilization may not need to be recalculated. Embodiments may also keep running totals of current maximum capacity utilization, in order to avoid the need to recompute the entire value. This approach may for example be employed by embodiments that measure capacity utilization through row counts. Avoiding the need to count the rows of a table may be helpful for performance reasons.

Various approaches may be employed to determine that a recalculation is in order. A recalculation may be determined to be in order based on the passage of time. Embodiments may determine to recalculate periodically, such as every hour or once a day. Embodiments may utilize a periodic recalculation schedule but skip recalculations when the state of the system has not changed sufficiently in the interim period. Other embodiments may perform recalculations based on the degree of changes to the system, and may impose a maximum time between recalculations.

If a recalculation is to be done, operations beginning at operation 704 may be performed. If a recalculation is not yet needed, requests to place additional logical collections may be received and processed, beginning at operation 708 and continuing on to operation 710.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

In a non-distributed DBMS, there may be a number of storage volumes on which files associated with database tables may be placed. Database tables may comprise a number of files that may be housed on the storage volumes. These files may be considered the equivalent of logical collections of data, and placed on the storage volumes using various aspects of the present disclosure. For example, a maximum currently utilized storage capacity may be determined by examining the space used on each storage volume. The rate of growth for the remaining volumes may be examined, and a projected number of days to maximum may be calculated for each, along with an average value. New files may be placed on those storage volumes having a projected number of days that is some threshold number above the average value.

Figure 8:
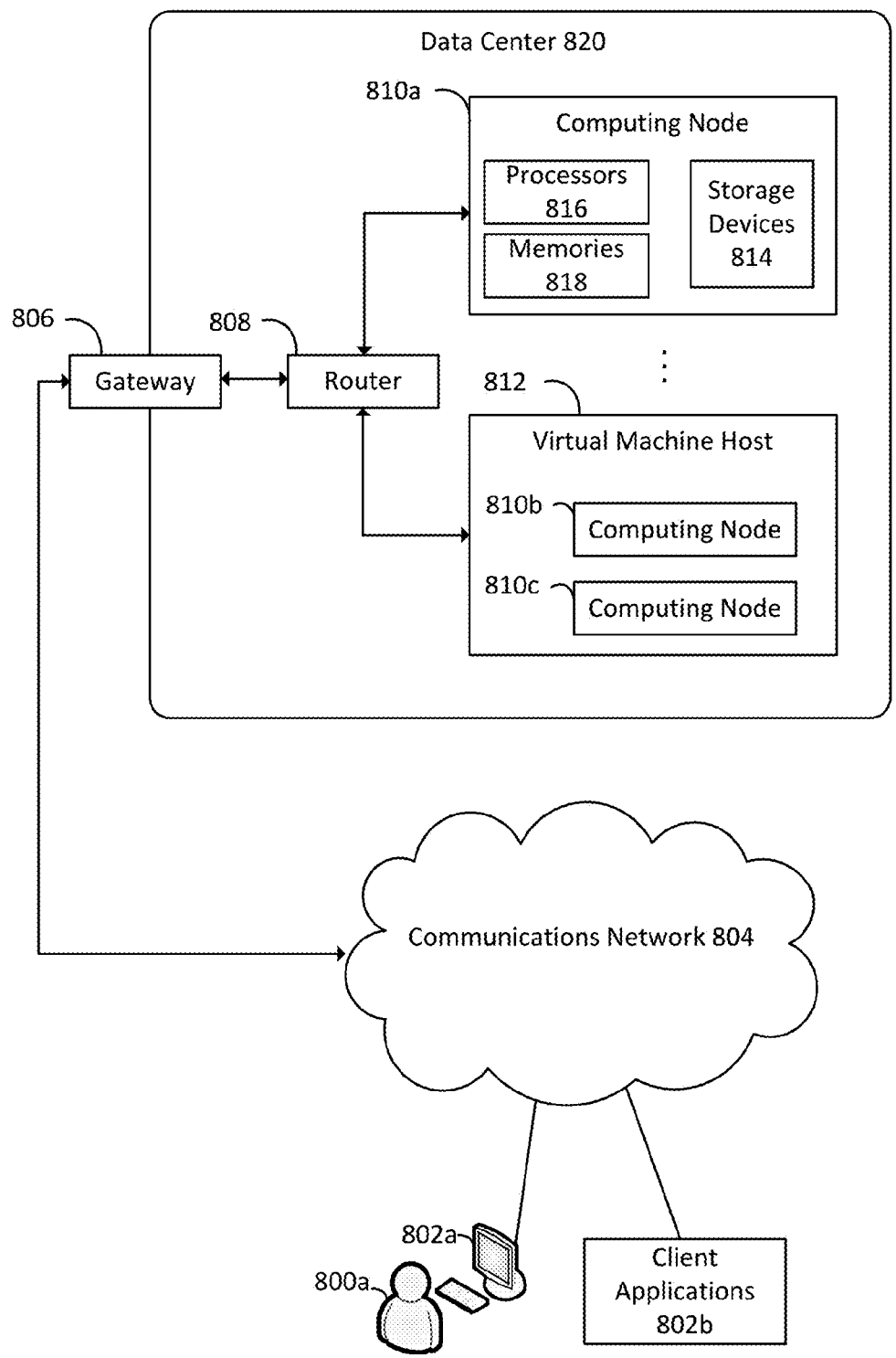
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b and 810c within a data center 820. Alternatively, client applications 802b may communicate without user intervention. Communications network 804 may comprise any combination of communications technology, including the Internet, wired and wireless local area networks, fiber optic networks, satellite communications and so forth. Any number of networking protocols may be employed.

Communication with processes executing on the computing nodes 810a, 810b and 810c, operating within data center 820, may be provided via gateway 806 and router 808. Numerous other network configurations may also be employed. Although not explicitly depicted in FIG. 8, various authentication mechanisms, web service layers, business objects or other intermediate layers may be provided to mediate communication with the processes executing on computing nodes 810a, 810b and 810c. Some of these intermediate layers may themselves comprise processes executing on one or more of the computing nodes. Computing nodes 810a, 810b and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818 and one or more storage devices 814. Processes on computing node 810a may execute in conjunction with an operating system or alternatively may execute as a bare-metal process that directly interacts with physical resources such as processors 816, memories 818 or storage devices 814.

Computing nodes 810b and 810c are depicted as operating on virtual machine host 812, which may provide shared access to various physical resources such as physical processors, memory and storage devices. Any number of virtualization mechanisms might be employed to host the computing nodes.

The various computing nodes depicted in FIG. 8 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database management system comprising:
    a plurality of computing nodes each computing node configured to store logical collections of data on one or more storage devices; and
    one or more memories having stored thereon computer-readable instructions that, upon execution, cause the system at least to:
    determine a maximum of current capacity utilization values for the plurality of computing nodes, wherein a capacity utilization value is based at least in part on storage capacity utilized by a computing node storing logical collections of data;
    determine an average length of time for the capacity utilization values of computing nodes in the plurality of computing nodes to reach the maximum of the current capacity utilization values;
    assign one or more computing nodes in the plurality of computing nodes to a subset of the plurality of computing nodes based at least in part on a length of time for the capacity utilization value of the one or more computing nodes to reach the maximum of current capacity utilization values exceeding the average length of time; and
    store a logical collection on one of the subset of computing nodes.

2. The system of claim 1, wherein the length of time of the one or more computing nodes is greater than the average length of time by a statistically significant amount.

3. The system of claim 1, further comprising one or more memories having stored thereon computer-readable instructions that, upon execution, cause the system at least to: assign one or more additional computing nodes to the subset of computing nodes when a count of computing nodes in the subset of computing nodes is less than a threshold value.

4. The system of claim 1, further comprising one or more memories having stored thereon computer-readable instructions that, upon execution, cause the system at least to: determine to store the logical collection on the one of the subset of computing nodes, the determining based at least in part on one of random selection, semi-random selection, round-robin selection, or hash-based selection.

5. The system of claim 1, further comprising one or more memories having stored thereon computer-readable instructions that, upon execution, cause the system at least to: determine the length of time of the one or more computing nodes based at least in part on a rate of change of storage capacity utilized by the one or more computing nodes.

6. A non-transitory computer-readable storage medium having stored thereon instructions that, upon execution by a computing device, cause the computing device at least to:
    determine a threshold of capacity utilization for a plurality of computing nodes each computing node maintaining logical collections of data on one or more storage devices;
    determine a length of time for a first computing node to reach the threshold of capacity utilization based at least in part on a rate of change of capacity utilization; and
    select the first computing node of the plurality of computing nodes to be excluded from association with one or more additional logical collections of data, the selection based at least in part on a length of time for the first computing node to reach the threshold of capacity utilization being less than a threshold value, the threshold value based at least in part on an average length of time for the plurality of computing nodes to reach the threshold of capacity utilization.

7. The computer-readable medium of claim 6, comprising further instructions that, upon execution by the computing device, cause the computing device to at least: determine the threshold value based at least in part on a confidence interval.

8. The computer-readable medium of claim 6, comprising further instructions that, upon execution by the computing device, cause the computing device to at least: permit the first computing node to be associated with additional logical collections of data when a number of computing nodes permitted to be associated with additional logical collections is less than a minimum value.

9. The computer-readable medium of claim 6, comprising further instructions that, upon execution by the computing device, cause the computing device to at least: associate an additional logical collection of data with one of the plurality of computing nodes other than the first computing node.

10. The computer-readable medium of claim 6, comprising further instructions that, upon execution by the computing device, cause the computing device to at least: determine the threshold of capacity utilization based at least in part on calculating a capacity utilization of each computing node of the plurality of computing nodes.

11. The computer-readable medium of claim 6, comprising further instructions that, upon execution by the computing device, cause the computing device to at least: determine the length of time for the first computing node to reach the threshold of capacity utilization based at least in part on a rate of change of storage capacity.

12. The computer-readable medium of claim 6, comprising further instructions that, upon execution by the computing device, cause the computing device to at least: determine the length of time for the first computing node to reach the threshold of capacity utilization based at least in part on linear estimation or non-linear estimation.

13. The computer-readable medium of claim 6, wherein the logical collection of data is a partition.

14. The computer-readable medium of claim 6, wherein the logical collection of data is stored within a partition.

15. A computer implemented method for storing data on a database management system, the method comprising:
    determining, by a processor, a maximum of capacity utilization among a plurality of computing nodes each computing node maintaining logical collections of data on one or more storage devices;
    determining an average length of time for the capacity utilization of computing nodes in the plurality of computing nodes to reach the maximum of capacity utilization; and
    excluding a first computing node of the plurality of computing nodes from association with one or more additional logical collections of data, based at least in part on a length of time for the first computing node to reach the maximum of capacity utilization being less than a threshold value, the threshold value based at least in part on the average length of time.

16. The method of claim 15, further comprising: calculating the threshold value based at least in part on a confidence interval for the average length of time.

17. The method of claim 15, further comprising:
    associating an additional logical collection of data with a computing node other than the first computing node, based at least in part on one of random selection, semi-random selection, round-robin selection, or hash-based selection.

18. The method of claim 15, wherein the maximum of capacity utilization is determined based at least in part on workload processed to maintain logical collections of data.

19. The method of claim 15, further comprising:
    permitting the first computing node to be associated with additional logical collections of data based at least in part on re-determining the maximum of capacity utilization.

20. The method of claim 15, further comprising: populating each computing node of the plurality of computing nodes with an initial set of logical collections of data.

\* \* \* \* \*